United States Patent [19]

Vogt et al.

[11] Patent Number: 4,937,530

[45] Date of Patent: Jun. 26, 1990

[54] APPARATUS FOR MONITORING PHASE VOLTAGES OF A POLYPHASE TACHOMETER GENERATOR TO DETECT PHASE FAILURES

[75] Inventors: Hartmut Vogt, Herzogenaurach; Ekkehard Reuss, Erlangen, both of Fed. Rep. of Germany

[73] Assignee: Siemens Aktiengesellschaft, Berlin & Munich, Fed. Rep. of Germany

[21] Appl. No.: 338,974

[22] Filed: Apr. 14, 1989

[30] Foreign Application Priority Data

Jul. 19, 1988 [DE] Fed. Rep. of Germany ....... 3824591

[51] Int. Cl.$^5$ .............................................. G01R 31/34
[52] U.S. Cl. ................................... 324/545; 324/511; 324/160; 324/546
[58] Field of Search ............... 324/160, 161, 177, 171, 324/172, 545, 546, 537, 158 MG, 51; 340/648; 361/23, 31, 33; 318/490

[56] References Cited

U.S. PATENT DOCUMENTS 3,662,252  5/1972  Smith .............................. 324/177 X
4,086,563  4/1978  Bachman ........................ 324/172 X
4,229,695  10/1980  Bassi ................................... 324/166
4,377,784  3/1983  Saito et al. ...................... 324/545 X Primary Examiner—Reinhard J. Eisenzopf
Assistant Examiner—Jack B. Harvey
Attorney, Agent, or Firm—Kenyon & Kenyon

[57] ABSTRACT

A method and circuit for monitoring phase voltages of a polyphase tachometer generator to detect a phase failure, where the tachometer generator is associated with a rotor position transmitter. The phase voltages are added up by a summing stage to form an auxiliary voltage. The auxiliary voltage is sampled at every commutation instant determined by a rotor position signal generated by the rotor position transmitter during a predetermined measuring time. This sampled voltage value is compared with a predetermined voltage value range. An indication of a tachometer fault is displayed as soon as a sampled voltage value is outside the predetermined voltage value range. By this method and circuit, a fault which occurs between two commutation instants can be detected at the next commutation instant.

4 Claims, 4 Drawing Sheets

APPARATUS FOR MONITORING PHASE VOLTAGES OF A POLYPHASE TACHOMETER GENERATOR TO DETECT PHASE FAILURES

FIELD OF THE INVENTION

The present invention relates to an improved method and apparatus for monitoring the phase voltages of a polyphase tachometer generator to detect phase failures.

BACKGROUND OF THE INVENTION

Polyphase driving machines fed by a converter, such as three-phase synchronous machines for example, which are provided with a tachometer generator and a rotor position transmitter are commercially available. In these machines, a speed-proportional voltage is generated from the phase voltages of the tachometer generator and fed to a speed controller with subordinated current control. The rotor position transmitter generates a rotor position signal, also called a commutation signal, which is fed to a selection logic circuit of the converter. If at any time at least one phase of the polyphase tachometer generator fails due to a short-circuit in the tachometer generator, the speed-proportional voltage is formed only from the phase voltages of the phases minus at least one phase. Thus, the formed actual speed value will no longer agree with the actual speed value of the driving machine. This can result in control difficulties which lead to a situation where the machine performing work must be turned off. In addition, the tachometer generator is heated up by a short-circuit or short-circuit current therein. If this machine is installed in a room containing an explosion hazard the surface temperature of the tachometer generator must not exceed a predetermined temperature. In this situation the machine performing work must be turned off.

A problem then is to provide a method and circuit arrangement for monitoring the phase-shifted phase voltages having a constant range of a polyphase tachometer generator in order to detect phase failures, so that a false indication of the actual speed value and a heating of the surface of the tachometer generator are prevented.

SUMMARY OF THE INVENTION

The above problem is solved according to the present invention by providing a method in which at any commutating instant determined by a rotor position signal generated by a rotor position transmitter, an auxiliary voltage is sampled during a predetermined measuring time. This sampled voltage value is compared with a predetermined range of voltage values, where an indication of a tachometer defect is generated as soon as a sampled voltage value is outside the predetermined voltage value range. By this method, the phase voltages are interrogated at the commutation instants, i.e., every 60° el or every 20° mech to determine whether all the phase voltages are still present at the output of the tachometer generator. If a short-circuit occurs, for instance, between two commutation instants so that at least one phase voltage fails, a detection of this short-circuit is made at the next sampling instant by a comparison of the sampled voltage value with the voltage value range. The occurrence of the defect can now be indicated visually and/or fed to the microprocessor of a process control in order to document it. It is thus possible to monitor the phase voltages of the tachometer generator for a voltage failure or short-circuit by the auxiliary voltage generated from the phase voltages. In this way, faults in the control and an increase in the surface temperature of the tachometer generator can be prevented.

In a circuit for monitoring the phase voltages having a constant range of a polyphase generator to detect a phase failure, according to the invention, the auxiliary voltage is present at the output of a summing stage that has separate inputs that each receives a phase voltage. A switching element is coupled to the output of the summing stage and is controlled by the rotor position signal via an edge-controlled monostable multivibrator. A limit indicator has an input coupled to the switching element to receive the auxiliary voltage. The output of the limit indicator is received by and triggers a storage circuit that causes the display to indicate a tachometer defect.

The circuit of the present invention provides that the auxiliary voltage can be sampled at a commutation instant and compared with a range of voltage values, with an indication of a tachometer fault being generated if the sampled voltage value is outside this range of voltage values. A fault which occurs between two commutation instants in which at least one phase voltage has failed can be ascertained in the subsequent sampling of the auxiliary voltage.

DETAILED DESCRIPTION

Figure 1:
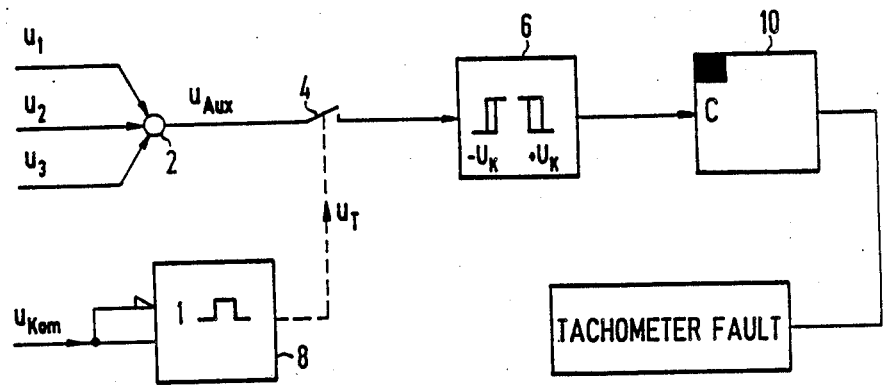
FIG. 1 shows a block diagram of an embodiment of a circuit constructed in accordance with the present invention for detecting short-circuits.

FIG. 1 shows a block diagram of a circuit arrangement for carrying out a method for monitoring the phase-shifted phase voltages $u_1$, $u_2$, and $u_3$ provided with a constant range of a polyphase tachometer generator to detect phase failures. This constant range is larger than 60 el and smaller than 180° el. The tachometer generator and a rotor position transmitter are coupled to the rotor of a polyphase driving machine. For reasons of greater clarity, the tachometer generator, the rotor position transmitter, and the work-performing machine are not shown.

The tachometer generator has a multiphase stator winding, the number of phases of which agrees with the number of phases of the work-performing machine. The tachometer generator is designed so that in each phase of the stator winding of the tachometer generator, a voltage is induced which is constant at least over a given angular range and the angular ranges, in which the individual phase voltages change from one polarity to the other, can overlap each other in time. In agreement with the three-phase stator winding of the driving machine, the tachometer generator also has a three-phase winding, of which the phase voltages $u_1$, $u_2$, and $u_3$ each are shown in a diagram versus the circular frequency $\omega t$ in FIG. 5. These phase voltages $u_1$, $u_2$ and $u_3$ are fed to separate inputs of a summing stage 2, and added there to form an auxiliary voltage $u_{Aux}$.

Figure 7:
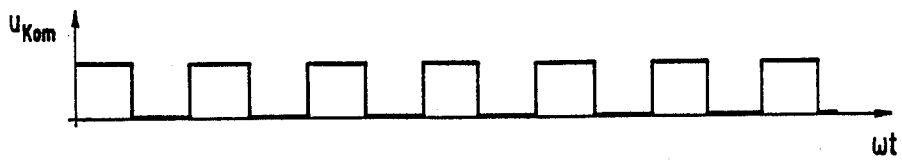
FIG. 7 is a diagram of the rotor position signal versus the circular frequency $\omega t$.

The auxiliary voltage $u_{Aux}$ present at the output of the summing stage 2 is fed to a limit indicator 6 via a switching element 4. The switching element 4 is controlled via a rotor position signal $u_{Kom}$ by an edge-controlled monostable multivibrator 8. The rotor position signal $u_{Kom}$ is generated by the rotor position transmitter of the driving machine (not shown). The rotor position signal $u_{Kom}$ is shown in FIG. 7 versus the circular frequency $\omega t$.

Figure 2:
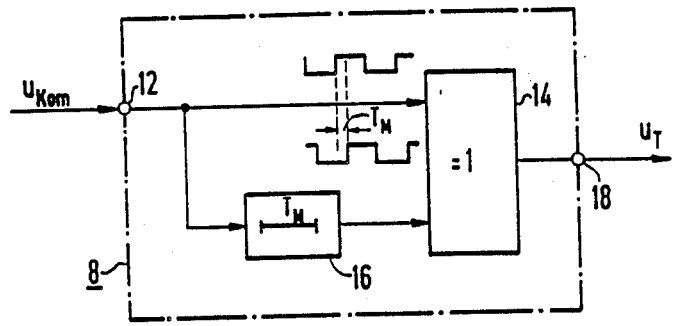
FIG. 2 shows a block diagram of a circuit of an edge-controlled monostable multivibrator used in the circuit of FIG. 1.
Figure 3:
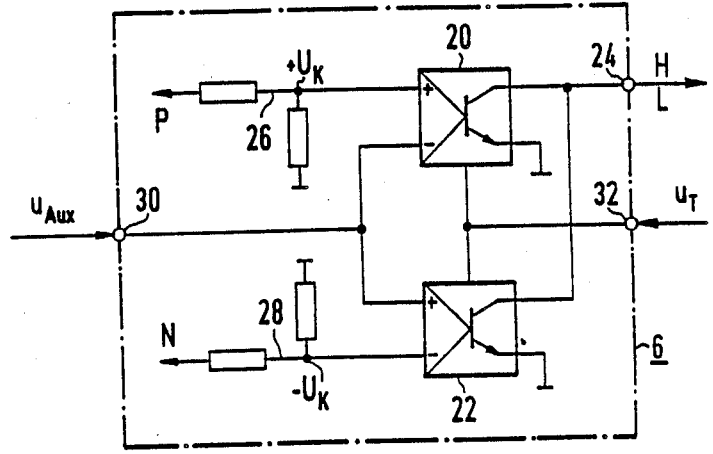
FIG. 3 shows a block diagram of a circuit of a window comparator with a switching element used in the circuit of FIG. 1.

A more detailed illustration of the limit indicator 6, a window comparator for example, is shown in FIG. 3. A more detailed illustration of the edge-controlled monostable multivibrator is shown in FIG. 2. The output of the limit indicator 6 is tied to a clock input C of a storage circuit 10 which is followed by a display that will indicate "tachometer fault". A detailed design of the storage circuit 10 can be seen in FIG. 4. With reference to the overall design seen in FIG. 1, at the output of the limit indicator 6 appears either a high signal or a low signal. By this signal the limit indicator 6 indicates that the voltage value of the auxiliary voltage $u_{Aux}$ at the input of the limit indicator 6 is either within or without a set range of voltage values. The presence of a high level at the output of the storage circuit 10 causes "tachometer fault" to be displayed.

Figure 8:
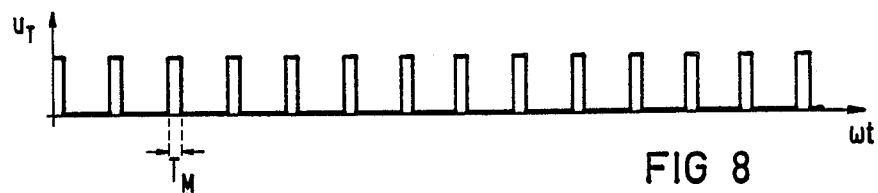
FIG. 8 is a diagram of the trigger sampling signal versus the circular frequency $\omega t$.
Figure 9:
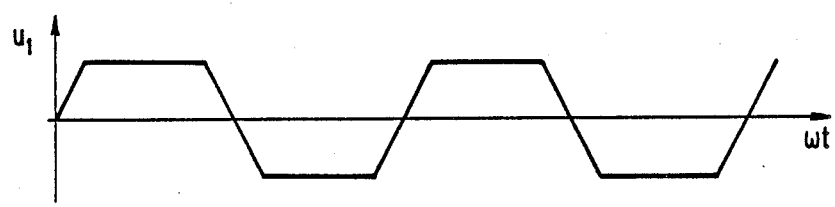
FIGS. 9 to 12 show diagrams of the phase voltages of the tachometer generator, the auxiliary voltage, the rotor position signal and the trigger sampling signal versus the circular frequency $\omega t$ when a disturbance occurs in the tachometer generator.
Figure 9:
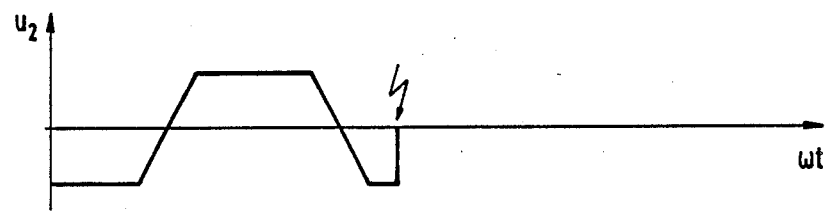
Figure 9:
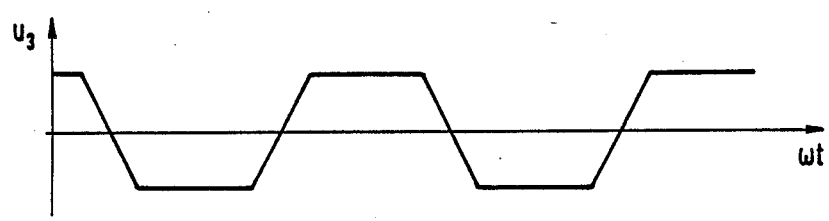
Figure 10:
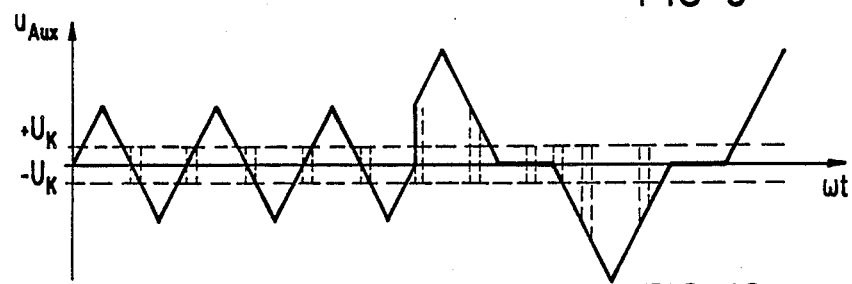
Figure 11:
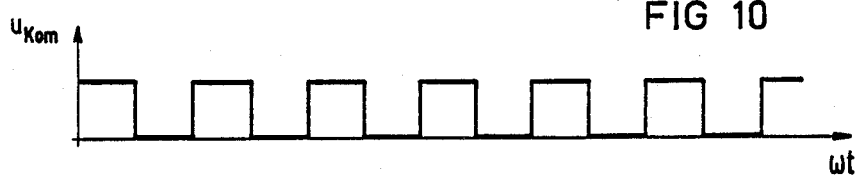
Figure 12:
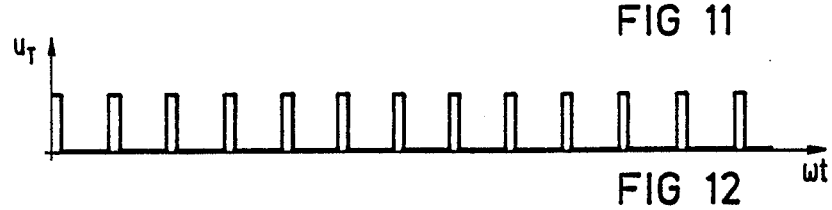

In FIG. 2, an embodiment of the edge-controlled monostable multivibrator 8 used in the circuit of FIG. 1 is shown in more detail. To the input 12 is applied the rotor position signal $u_{Kom}$ which is fed to a first input of an EXOR gate 14 and via a time delay stage 16 to a second input of the EXOR gate 14. At the output 18 of the EXOR gate 14 a trigger sampling signal $u_T$ is present. A plot of the trigger sampling circuit versus the circular frequency $\omega t$ is shown in FIG. 8. The time delay stage 16 causes a shift in time of the rotor position signal $u_{Kom}$ by a time $T_M$. This time $T_M$ is also called the sampling time $T_M$. At the output 18 of the EXOR gate 14 a high signal appears as long as a high signal is present at one of its inputs and a low signal at its other input. Thus a high signal is obtained at the beginning of every edge of the rotor position signal $u_{Kom}$ which remains at the high level for the sampling time $T_M$. When the trigger sampling signal $u_T$ is at the high level, the switching element 4 is closed in the circuit of FIG. 1.

In FIG. 3, an embodiment of the limit indicator 6 with an integrated switching element 4 is shown in more detail. As the limit indicator 6, by way of an example a known window comparator can be used such as that described by U. Tietze Ch. Schenk, in "Halbleiter-Schaltungstechnik", 6th Edition, 1983 page 180. This window comparator, as seen in FIG. 3, contains two comparators 20 and 22 the outputs of which form a common output 24 of the limit indicator 6. The noninverting input of the comparator 20 is coupled to an output of a voltage divider 26, while the inverting input of the comparator 22 is coupled to the inverting input of the voltage divider 28. A voltage value $+U_K$ is present at the output of the voltage divider 26 and a voltage value of $-U_K$ is present at the output of the voltage divider 28. The auxiliary voltage $u_{Aux}$ is received via the input 30 of the limit indicator 6 at the inverting input of the comparator 20 and at the noninverting input of the comparator 22. The trigger sampling signal $u_T$ is fed via a trigger input 32 of the limit indicator 6 to the comparators 20 and 22. The switching element 4 is realized by activation of the comparators 20 and 22 while the trigger sampling signal $u_T$ is at a high level. Thus, it is possible to ascertain with this embodiment of the limit indicator 6 whether the auxiliary voltage $u_{Aux}$ is within or without the range of voltage values $+U_K$ and $-U_K$ during the sampling time.

Figure 4:
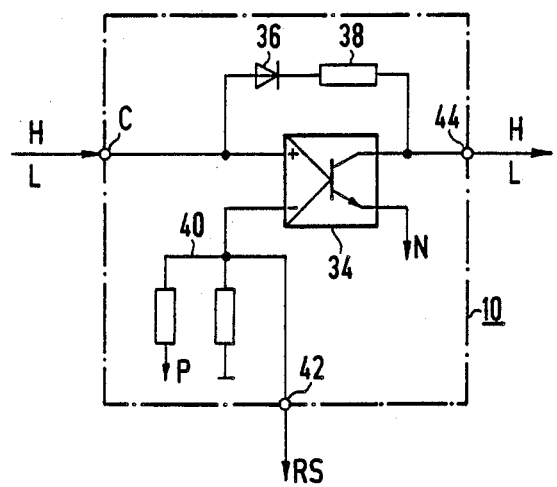
FIG. 4 illustrates an embodiment of a storage circuit used in the circuit of FIG. 1.

In FIG. 4, an embodiment of the storage circuit 10 used in the circuit of FIG. 1 is shown. The exemplary embodiment of the storage circuit 10 shown in FIG. 4 has a comparator 34 whose noninverting input is tied to its output via a series feedback circuit, comprising a diode 36 and a resistor 38. The inverting input of the comparator 34 is connected to a voltage divider 40 and a reset input 42. The noninverting input of the comparator 34 is tied to a clock input C of the storage means 10. From the output 44 of the storage circuit, a high signal or a low signal is obtained depending on the signal present at the clock input. If a low signal is present at the clock input C, then the output of the comparator 34 also goes into the low state. This low state is held by the feedback circuit. The comparator 34 can be reset to its starting point by a reset signal fed to the reset input 42.

Figure 4A:
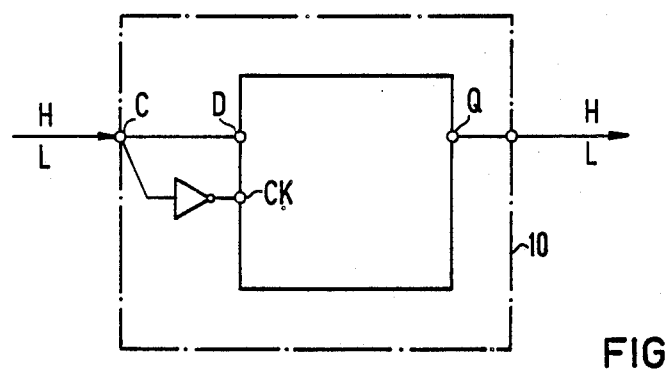
FIG. 4a illustrates another embodiment of a storage circuit used in the circuit of FIG. 1.

In the embodiment of the storage circuit 10 shown in FIG. 4a, a D-flip-flop is used, at the data input of which a high level is present with the Q output tied to the "tachometer fault" display. The clock input of this D-flip-flop is preceded by an inverter. A low signal at the output of the limit indicator 6, which indicates that the sampled voltage value of the auxiliary voltage $u_{Aux}$ is outside the range of voltage values $+U_K$ and $-U_K$, will therefore become a high signal at the Q output of the D-flip-flop, and causes "tachometer fault" to be displayed.

Figure 4B:
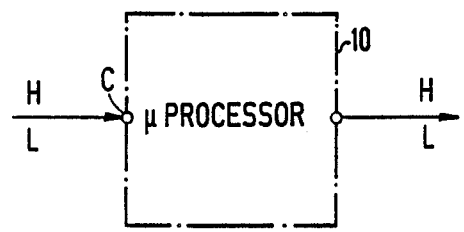
FIG. 4b illustrates another embodiment of a storage circuit used in the circuit of FIG. 1.

FIG. 4b shows an embodiment of the storage circuit 10 using a microprocessor of a process control. This embodiment is used if automatic intervention into the control unit controlled by the microprocessor is to be made, or documentation is to be provided by the microprocessor. This is in addition to the causing "tachometer fault" to be displayed.

Figure 5:
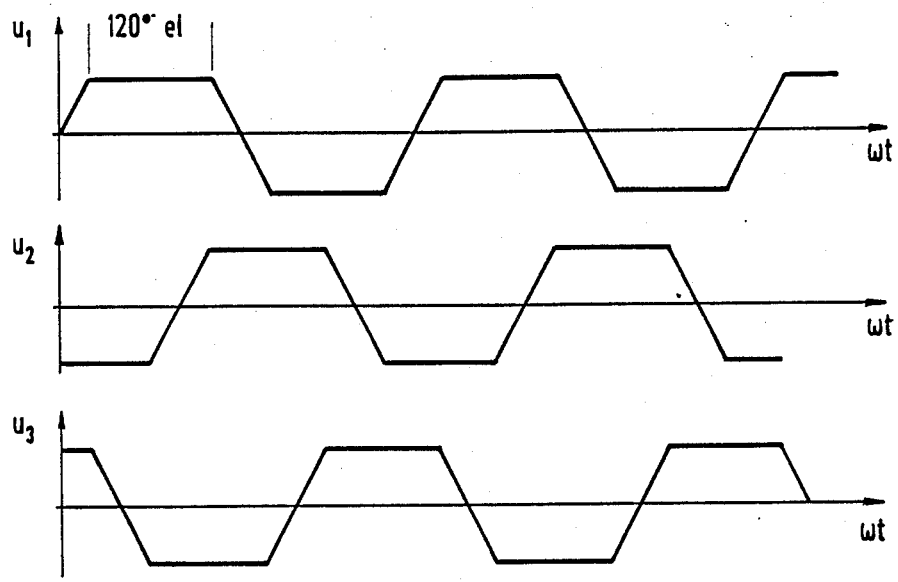
FIG. 5 is a diagram of the phase voltages of a tachometer generator versus the circular frequency $\omega t$.

In FIG. 5, each of the phase voltages $u_1$, $u_2$ and $u_3$ are shown in a diagram versus the circular frequency $\omega t$. As is shown in FIG. 5, the phase voltages $u_1$, $u_2$ and $u_3$ of the tachometer generator have trapezoidal waveforms. The constant range of these phase voltages $u_1$ to $u_3$ extends over 120° el. Thereby, the inclined regions of the individual phase voltages $u_1$ to $u_3$ do not overlap in time.

Figure 6:
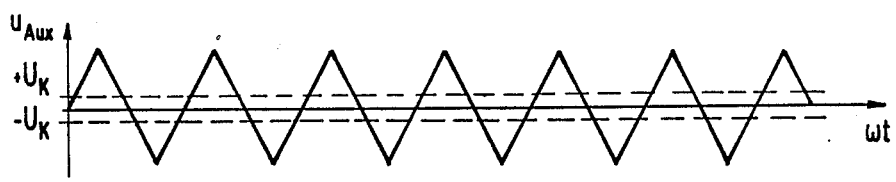
FIG. 6 is a diagram of the auxiliary voltage versus the circular frequency $\omega t$.

In FIG. 6, the auxiliary voltage $u_{Aux}$ is shown in a diagram versus the circular frequency $\omega t$. This auxiliary voltage $u_{Aux}$ was generated by the addition of the three phase voltages $u_1$, $u_2$ and $u_3$. Due to the fact that in a drive arrangement with a three-phase drive machine, the angular range in which the individual phase voltages $u_1$ to $u_3$ of the tachometer generator are constant extends over 120° el, a triangular waveform of the auxiliary voltage $u_{Aux}$ is obtained. The amplitude of the waveform corresponds to the amplitude of the individual phase voltages $u_1$ to $u_3$. In addition, two constant voltages are shown in the diagram each with a constant amplitude $+U_K$ and $-U_K$ versus the circular frequency $\omega w$. These two voltages $+U_K$ and $-U_K$ therefore form a range of voltage values.

The rotor position signal $u_{kom}$ generated by the rotor position transmitter is shown in the diagram in FIG. 7 versus the angular frequency $\omega t$. The rotor position signal $u_{kom}$ is a squarewave signal, the level state of which changes every 60°el. Thereby, the commutation instant is determined with every edge of the squarewave signal.

In FIG. 8, the trigger sampling signal $u_t$ is shown in a diagram versus the circular frequency $\omega t$. This trigger sampling signal $u_T$ is a squarewave signal where the signal jumps to the high level at every commutation instant, i.e. every 60° el and remains in this level state for a time $T_M$. This time $T_M$ is the sampling time $T_M$, at which the auxiliary voltage $u_{Aux}$ is present at the limit indicator 6. In FIGS. 5 to 8, the signal waveforms are shown for an undisturbed case, i e., if no phase voltage fails.

FIGS. 9 to 12, on the other hand, show the corresponding signal waveforms of FIGS. 5 to 8 with a short circuit occurring in the tachometer generator. From this instant on, the phase voltage $u_2$ is missing. Prior to this instant, all sampling voltage values are within the voltage value range $+U_K$, $-U_K$ so that a high signal is present at the output 24 of the limit indicator 6 according to FIG. 3. At the instant of the short-circuit, the auxiliary voltage $u_{Aux}$ executes a voltage jump which is then followed by a triangular voltage which has the value 0 volts over 60° el between two maxima. The maximum amplitude of the auxiliary voltage $u_{Aux}$ is now twice the amplitude value of a single phase voltage $u_1$ or $u_3$. Due to the voltage jump at the instant of the occurrence of the fault, the sampled voltage value is outside the voltage value range $+U_K$, $-U_K$ so that a low signal is present at the output 24 of the limit indicator 6. This triggers the storage circuit 10. The storage circuit 10 produces a low signal or a high signal at its output in dependence on the particular embodiment of the storage circuit 10, whereby "tachometer fault" is displayed.

By this method of monitoring the phase-shifted phase voltages $u_1$, $u_2$ and $u_3$ having a constant range of a polyphase tachometer generator to detect a phase failure and the circuit arrangement for carrying out the method, the failure of at least one phase within an angular range of 60° el or 20°. mech can be ascertained and displayed.

What is claimed:

1. A circuit for monitoring phase voltages having a constant range of a polyphase tachometer generator to detect a phase failure, the tachometer generator being coupled to a rotor position transmitter that generates rotor position signals, the circuit comprising:
   a summing stage which receives as inputs said phase voltages and produces as an output an auxiliary voltage which is the sum of said phase voltages;
   a switching element coupled to the output of said summing stage;
   a limit indicator having an output and an input that is coupled to said switching element so as to receive said auxiliary voltage;
   a storage circuit coupled to and triggered by the output of said limit indicator;
   a tachometer fault display coupled to the storage circuit;
   an edge-controlled monostable multivibrator that receives as an input said rotor position signal and controls said switching element in dependence on said rotor position signal;
   wherein the storage circuit includes a comparator having inverting and noninverting inputs, a voltage divider having an output coupled to said inverting input, a reset input coupled to said inverting input, and a diode and a resistor coupled in series between said noninverting input and the output of the comparator.

2. The circuit of claim 1, wherein the limit indicator is a window comparator.

3. The circuit of claim 1, wherein the storage circuit is a D-flip-flop having a data input, said data input being tied to a high voltage level.

4. The circuit of claim 1, wherein the storage circuit is a microprocessor.

* * * * *